Sept. 12, 1944.  J. M. BOWEN ET AL  2,357,928
SLED
Filed March 16, 1943  2 Sheets-Sheet 1
Fig. 1.
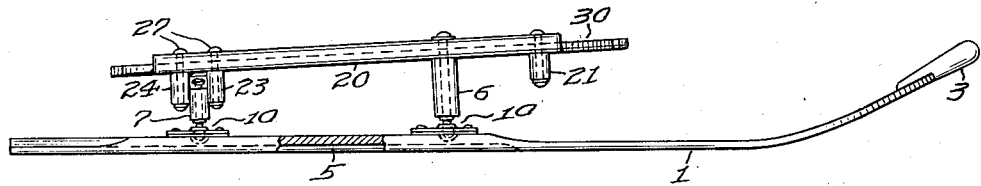
Fig. 2.
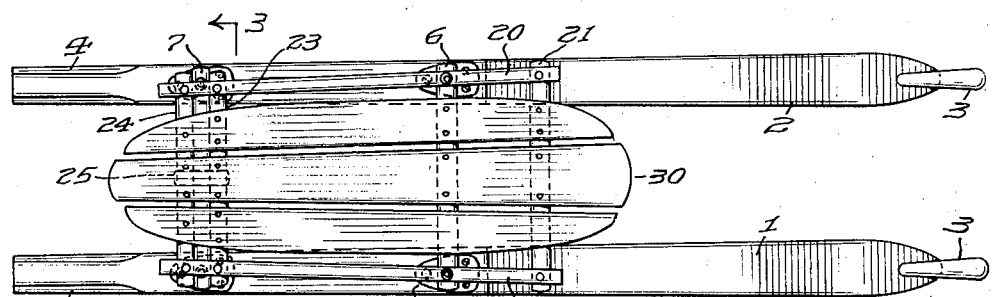
Fig. 3.
Fig. 4.
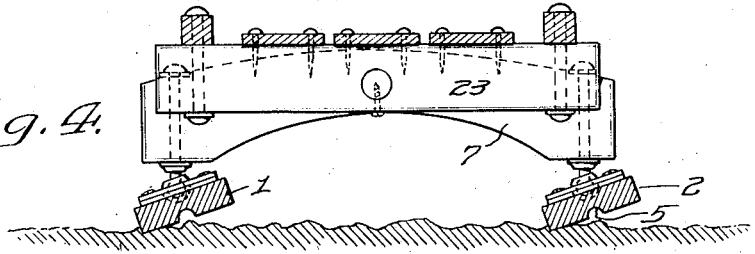
Fig. 5.
INVENTORS
James Monroe Bowen,
Edwin K. Bonner Jr.
BY
ATTORNEY
WITNESS
F. J. Hartman.

Sept. 12, 1944.  J. M. BOWEN ET AL  2,357,928
SLED
Filed March 16, 1943    2 Sheets-Sheet 2

INVENTORS
James Monroe Bowen,
Edwin K. Bonner Jr.
BY
ATTORNEY

WITNESS

Patented Sept. 12, 1944

2,357,928

UNITED STATES PATENT OFFICE 2,357,928

SLED

James Monroe Bowen, Cape May Court House, N. J., and Edwin K. Bonner, Jr., Torresdale, Pa., assignors to S. L. Allen & Co., Inc., Philadelphia, Pa., a corporation of Pennsylvania Application March 16, 1943, Serial No. 479,334

9 Claims. (Cl. 280—22)

The sled of our invention is of distinctly different design and construction from the usual steering sleds embodying narrow laterally flexible metallic runners and comprehends novel features which contribute to its adaptability for use on various types of coasting surfaces such as soft snow, hard snow or even ice, which enable it to be readily steered on a desired course and which provide extremely good riding qualities. It therefore marks a distinct departure from conventional sled practice.

More particularly, a principal object of the invention is the provision of a sled having runners approximating a conventional ski in design and thus presenting a relatively wide face for normal engagement with the surface on which the sled is supported, the runners being so arranged that they may be independently inclined or oscillated transversely substantially about their longitudinal median lines or axes to steer the sled.

A further object is the provision in a sled having runners of the aforesaid character of means for supporting the sled deck therefrom in such manner that either runner, while capable of the aforesaid oscillation, can be raised from the sled supporting surface, when it encounters an obstacle or the like, without disturbing the relation of the other runner thereto, the first runner, deck and other parts moving relatively to the other runner under such conditions.

A still further object is the provision in a sled of a 3-point suspension or support for the sled deck whereby maximum freedom of movement in predetermined directions between the runners and the deck is attained and the riding and steering qualities of the sled enhanced.

Other objects and novel features of design, construction and arrangement comprehended by our invention are hereafter more fully pointed out or will be apparent to those skilled in the art from the following description of a preferred embodiment of our sled as illustrated in the accompanying drawings in which:

Fig. 1 is a side elevation of the sled as it appears when resting on a flat surface;

Fig. 2 is a top plan view thereof;

Fig. 3 is an enlarged transverse vertical section substantially on line 3—3 in Fig. 2 looking in the direction of the arrows with certain parts broken away to better show internal construction;

Fig. 4 is a view generally similar to Fig. 3 but showing the runners oscillated or "edged" as when the sled is being steered to the right;

Fig. 5 is an enlarged fragmentary detail in transverse vertical section through one of the runners and associated parts;

Like characters of reference are used to designate the same parts in the several figures.

Figure 6:
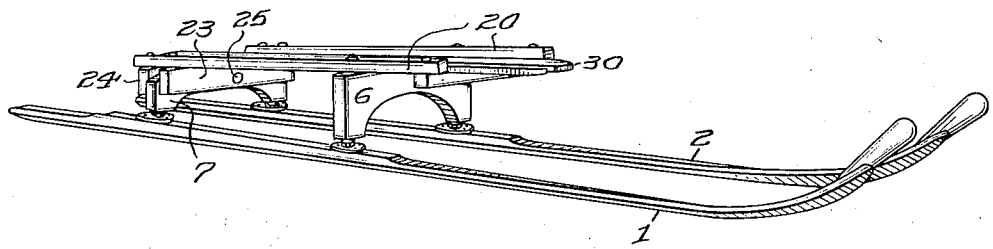
Fig. 6 is a perspective view of the sled with the runners edged to the left as when making a turn thereto.

Referring now more particularly to the drawings, as hitherto stated and as shown therein, the sled comprises a pair of runners 1, 2, each preferably made of wood and conforming in general design to a conventional ski, disposed in substantially parallel relation and suitably spaced apart. Approximately the rear half of each runner is of rectangular or substantially rectangular cross section and considerably thicker than the front half which is faired down to increase its flexibility vertically and longitudinally while its forward extremity is curved upwardly, tapered in on each side and provided with a grip 3 of a shape to afford a comfortable hand hold for the occupant of the sled; if desired, the upper corners of each runner adjacent its rear end may be chamfered off as at 4 to enhance appearance and lessen weight. The runners are of maximum width, usually in the neighborhood of 3", just in rear of their turned-up ends and thence desirably taper slightly rearwardly, and each thus presents a relatively wide flat or substantially flat under face for engagement with a supporting surface and this face may, if desired, be provided with one or more longitudinal grooves 5 extending from the rear end of the runner to a point a little in advance of that where it begins to thin out, these grooves tending to prevent the sled from slipping sideways when in motion. The runners may be flat rearwardly of their turned-up portions as shown, but if preferred may be formed with a slight camber similar to the usual ski, and may be either solid or laminated, again in conformity with ordinary ski construction.

Disposed above and extending transversely of the runners are a pair of longitudinally spaced bolsters 6, 7 which are connected to the runners as hereinafter described. The front bolster 6, which is located adjacent the front ends of the thick parts of the runners, is preferably flat on its upper edge and transversely arched at its lower between the runners, while the rear bolster 7 is similarly arched but transversely downwardly curved from its center along its upper edge (Figs. 3, 4 and 8), the bolsters being preferably made of wood and of sturdy construction.

The means by which the bolsters are connected adjacent their lower lateral extremities to the runners are designed to permit independent oscillation of the latter relatively to the bolsters substantially about the median longitudinal axes of the runners, and while the said means may be of any type and construction suitable for this purpose, we prefer to utilize ball and socket connecting means such as are most clearly illustrated in Fig. 5 and generally designated as 10 in the drawings, said means therefore comprising a pair of plates 11, 12 which are struck out in opposite directions proximate their centers to form substantially hemispherical cavities so that when the plates are reversed, superposed on each other and secured by screws 13 to the upper surface of the runner they will define a substantially spherical socket for the reception of a ball 15 on one end of a stem 16 which passes through a hole in the center of the struck-out portion of plate 12 and thence upwardly through the superjacent portion of the bolster 6 or 7 as the case may be, a flange 17 integral with or welded to the stem above the ball forming a seat for the under face of the bolster. In the case of rear bolster 7 stems 16 are carried to its upper face and there headed over against washers to firmly secure them in place, while in the case of front bolster 6 they are extended not only through the bolster but also through the superimposed side rails 20, hereinafter described, and similarly headed over against washers on the upper surfaces of the latter, thus firmly uniting the side rails and bolster at this point.

The said side rails 20 are disposed substantially over each runner and extend from a point somewhat in advance of the front bolster to one somewhat in rear of the rear bolster and, near their forward ends, are connected by a transversely extending cleat 21 lying underneath and riveted near its extremities to the superjacent extremities of the rails, while the latter are connected near their rear ends by a pair of transversely extending benches 23, 24 respectively disposed on opposite sides of and closely adjacent the rear bolster 7 to which they are pivoted by a longitudinally extending pivot pin 25 located midway between its ends.

The ends of this pin fit tightly in holes at the centers of the benches and are prevented from turning in any convenient way as by a nail 26 driven through the bench and into the pin, while its center portion has a somewhat looser fit in the hole in the bolster through which it passes so as to insure freedom of oscillation of the benches relatively to the bolster. It is preferable that the diameter of the pin be relatively great to minimize wear between it and the bolster and also, particularly when the pin is made of wood, to insure the requisite strength at this point. As stated, rails 20 overlie the benches and are suitably secured to their upper faces as by bolts 27 extending downwardly through the rails and benches and headed over against washers seating on the lower faces of the latter.

The cleat 21, front bolster 6 and benches 23, 24 support the sled deck 30 which may be in one piece or, as shown, composed of a plurality of pieces nailed or otherwise secured to the deck supporting parts, the front end of the deck terminating somewhat in advance of the cleat and the rear end somewhat behind the bench 24. The deck thus lies between and in slightly spaced relation to side rails 20 so the latter can be readily grasped to lift or otherwise move the sled about. While the provision of the side rails is desirable they may be omitted if preferred and the deck made heavier, widened if desired, and secured more firmly to its supporting members than is requisite when the side rails are present.

It will now be apparent that in a sled constructed as hitherto described, rear bolster 7 is capable of limited oscillation about pin 25 with respect to the rigid unitary structure or assembly comprising the deck, cleat 21, front bolster, side rails and benches; that each runner is likewise capable of limited oscillation with respect to the two bolsters substantially about its longitudinal median line or axis and finally that the rear bolster is constantly maintained parallel to the front bolster by the benches between which it is disposed and pin 25 correspondingly relieved of lateral thrust, whereby, in turn, the runners are at all times positively maintained in alignment and properly spaced apart and any tendency of one runner to advance ahead of the other or vice versa definitely prevented. It will also be apparent that the unitary deck assembly as above defined is supported at three points, namely, the two front bolster connecting means 10 and the pivot pin 25, so that when the runners are resting on a supporting surface either may be lifted directly upward or at one end or the other without disturbing the other runner, the deck assembly accommodating itself to the movements of the lifted runner as required, the whole construction thus affording extreme flexibility yet constantly maintaining the runners in properly aligned relation transversely and longitudinally while allowing them to rise and fall with respect to each other and to be independently oscillated about connections 10 as hitherto explained.

When the sled is being used for coasting, the operator lies face down on the deck and grasps grips 3 at the forward ends of the runners whereby his weight is centered approximately over the bolster 6, and as long as it is desired to have the sled move in a straight line, as it tends to do under all ordinary conditions, he exercises little or no pressure on the grips. To steer it in either direction, however, twisting pressure is exerted on the grips primarily to turn the runners edgewise on connections 10 and also to twist their forward portions somewhat in the direction in which it is wished to direct the sled, that is, pressure is applied to the grips so as to force the left hand lateral edges of the runners downwardly and raise their right hand edges when it is desired to turn to the left (Fig. 6) and vice versa substantially as skis are similarly "edged" to the left to turn thereto and "edged" to the right to turn in that direction. The turning effort thus imposed on the sled may be enhanced by a slight shifting of the operator's weight upon the deck toward the side to which the turn is being made and under actual operating conditions it is found that with very little practice the sled may be steered with the utmost ease and with almost the same degree of sharpness as the usual conventional steering sled having laterally flexible metal runners.

Figure 7:
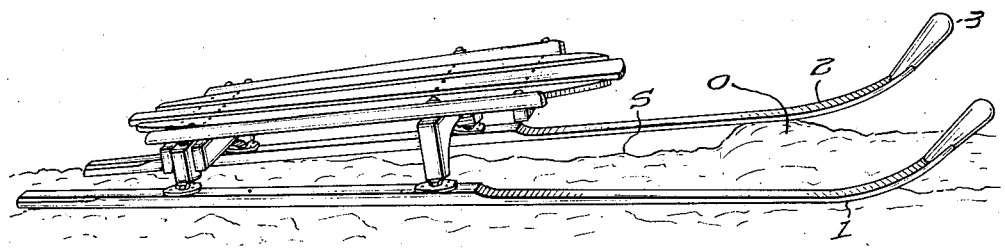
Fig. 7 is also a perspective view of the sled showing it substantially as it appears when the left hand runner encounters an obstacle.
Figure 8:
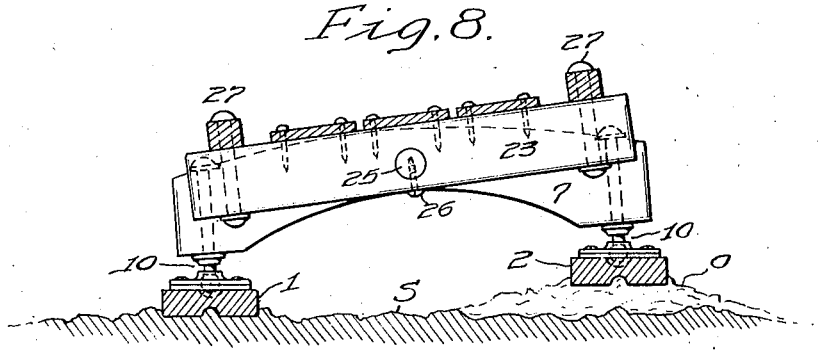
Fig. 8 is a view generally similar to Fig. 3 but with the runners in the position of Fig. 7.

Mention has been made of the fact that either runner may be raised relatively to the sled supporting surface without disturbing the relation of the other runner thereto and Figs. 7 and 8 are illustrative of this capacity, showing as they do the position of the parts when one of the runners of the moving sled, in this case left hand runner 2, encounters an obstacle O such as a cake of hard snow or ice which tends to lift its forward end initially (Fig. 7) and then its more rearwardly disposed portions as the runner travels over it. It will be observed that under these conditions the right hand runner 1 remains in its normal position on the snow S or other supporting surface but that the deck assembly as a whole is lifted and generally inclined to the right as, turning on pivot 25 and its forward connections 10, it accommodates itself to the movements of runner 2. In consequence of this ability of the deck assembly to move in accordance with vertical motion of either runner without disturbing the normal position of the other, the sled when traveling over a rough surface has an extremely easy motion which materially contributes to the enjoyment of the user.

A distinct advantage of our sled in addition to its ease of steering, ability to travel comfortably over rough terrain and extreme speed on almost any type of surface suitable for coasting, resides in the fact that its construction requires the use of but a minimum amount of metal since its major parts are preferably, though not necessarily, formed of wood and it is thus well adapted to production under existing conditions when metal is frequently difficult to obtain.

Finally, it is to be understood that while we have herein illustrated and described a preferred embodiment of our invention with considerable particularity, we do not thereby desire or intend to specifically restrict or confine ourselves thereto in any way as if desired many changes and modifications may be made in details of design, construction and assembly and in other particulars without departing from the spirit and scope of the invention as defined in the appended claims.

Having thus described our invention, we claim and desire to protect by Letters Patent of the United States:

1. A sled comprising laterally spaced runners each approximating a conventional ski in design, a hand grip at the forward end of each runner in substantial prolongation thereof, a pair of longitudinally spaced bolsters extending transversely between the runners, means hingedly connecting each runner with each bolster whereby the runners may be independently oscillated by the grips substantially about their median lines and their forward parts twisted on themselves to depress either of their lateral edges and correspondingly elevate the other edge, and deck structure supported above the bolsters.

2. A sled comprising laterally spaced runners each approximating a conventional ski in design, a pair of longitudinally spaced bolsters extending transversely between the runners, means hingedly connecting each runner to each bolster for oscillation in a plane parallel to the bolsters whereby either lateral edge of either runner may be depressed and its other lateral edge correspondingly raised relatively to the bolsters, a hand grip at the front end of each runner in substantial prolongation thereof whereby said oscillation may be effected and the forward part of the runner twisted on itself by the occupant of the sled, and deck structure supported by and above the bolsters.

3. A sled having laterally spaced runners each adapted for oscillation substantially about its longitudinal axis and runner interconnecting means extending therebetween, and a deck structure above the runners movably supported at three points, one located on each runner and the third midway between the runners on one of the connecting means.

4. A sled having a pair of laterally spaced runners each upwardly inclined at its forward end and presenting a relatively wide under face for contact with a supporting surface, longitudinally spaced bolsters extending transversely between the runners, means hingedly connecting each runner therewith whereby the runners may be oscillated substantially about their longitudinal median axes relatively to the bolsters, and deck structure rigidly secured to one bolster and pivotally connected to the other bolster.

5. A sled having a pair of laterally spaced runners each upwardly inclined at its forward end and presenting a relatively wide under face for contact with a supporting surface, longitudinally spaced bolsters extending transversely between the runners, means hingedly connecting each runner therewith whereby the runners may be oscillated substantially about their longitudinal median axes relatively to the bolsters, deck structure rigidly secured to the front bolster, and means interconnecting said structure and the rear bolster for relative oscillation about a longitudinal axis.

6. A sled having a pair of laterally spaced runners each upwardly inclined at its forward end and presenting a relatively wide under face for contact with a supporting surface, longitudinally spaced bolsters extending transversely between the runners, means hingedly connecting each runner therewith whereby the runners may be oscillated substantially about their longitudinal median axes relatively to the bolsters, deck structure rigidly secured to and supported by the front bolster and including a bench lying proximate the rear bolster, and a longitudinally extending pivot pin interconnecting said bench and bolster for relative oscillation about the axis of the pin.

7. A sled having a pair of laterally spaced runners each upwardly inclined at its forward end and presenting a relatively wide under face for contact with a supporting surface, longitudinally spaced bolsters extending transversely between the runners, means hingedly connecting each runner therewith whereby the runners may be oscillated substantially about their longitudinal median axes relatively to the bolsters, and deck structure overlying and rigidly secured to the front bolster and including a pair of benches disposed on opposite sides of and parallel to the rear bolster, and a longitudinally extending pivot pin interconnecting said benches and bolster.

8. A sled comprising a pair of laterally spaced runners each approximating a conventional ski in design, a hand grip at the front end of each runner, a pair of longitudinally spaced transversely extending bolsters above the runners, ball and socket means movably connecting each bolster with the subjacent portion of each runner, a bench disposed on each side of and parallel to the rear bolster, laterally spaced side rails extending from the front bolster to said benches and rigidly secured to each, pivot means interconnecting the benches with the rear bolster for relative movement about a longitudinal axis, and a deck between the side rails supported by and secured to the front bolster and the benches.

9. A sled comprising a pair of laterally spaced wooden runners each presenting a relatively wide under face for contact with a supporting surface and having its front end curved upwardly, the front portion of the runner being sufficiently thin to enable it to be twisted laterally by application of twisting force to its said end, a hand grip on said end, a pair of longitudinally spaced bolsters above the runners, ball and socket connections between the bolsters and each runner, and a deck structure including a deck and side rails laterally spaced therefrom all rigidly secured to the front bolster, a pair of benches adjacent and lying on opposite sides of the rear bolster and rigidly secured to the deck and rails, and a longitudinally extending pivot pin connecting the benches and rear bolster for oscillation about its axis.

JAMES MONROE BOWEN.
EDWIN K. BONNER, Jr.